United States Patent
Buitenwerf et al.

(10) Patent No.: US 6,589,467 B2
(45) Date of Patent: Jul. 8, 2003

(54) METHOD OF FORMING A SADDLE TREE MOLD

(76) Inventors: Michelle L. Buitenwerf, 2236 Balsam Ridge Rd. SW., Bemidji, MN (US) 56601-8221; Eric J. Buitenwerf, 2236 Balsam Ridge Rd. SW., Bemidji, MN (US) 56601-8221

(*) Notice: Subject to any disclaimer, the term of this patent is extended or adjusted under 35 U.S.C. 154(b) by 0 days.

(21) Appl. No.: 09/927,688

(22) Filed: Aug. 10, 2001

(65) Prior Publication Data

US 2003/0030178 A1 Feb. 13, 2003

(51) Int. Cl.$^7$ ................................................ B29C 33/40
(52) U.S. Cl. .................. 264/222; 264/219; 264/220; 264/320
(58) Field of Search ................................ 264/219, 220, 264/222, 320; 425/2

(56) References Cited

U.S. PATENT DOCUMENTS

| | | | | |
|---|---|---|---|---|
| 3,529,402 A | * | 9/1970 | Queen .......................... 54/44.7 |
| 3,819,796 A | * | 6/1974 | Webster et al. .............. 264/222 |
| 4,615,856 A | * | 10/1986 | Silverman ..................... 264/222 |
| 5,577,372 A | * | 11/1996 | Gronberg ........................ 54/66 |
| 6,206,207 B1 | * | 3/2001 | Kelley ....................... 211/85.11 |
| 6,434,916 B1 | * | 8/2002 | Tucker ......................... 54/44.5 |

* cited by examiner

Primary Examiner—Allan R. Kuhns
(74) Attorney, Agent, or Firm—Robert E. Kleve

(57) ABSTRACT

The invention relates to the process of forming a customized saddle tree mold to be used in turn as a model to make or select a saddle tree. The method or process involves the steps of warming a thermoplastic sheet to a pliable condition, applying the panel to the saddle area of a equine, while pliable, applying pressure against the outside of the panel to force the panel against the horse to change the shape of the panel to closely and accurately conform to the shape of the equine in the saddle area, allowing the panel to cool and harden in that shape so that it may be used in turn as a form or mold to shape or select a saddle tree for that equine, which saddle tree being shaped to the form will accurately and closely conform to the shape of that equine in the saddle area.

3 Claims, 1 Drawing Sheet

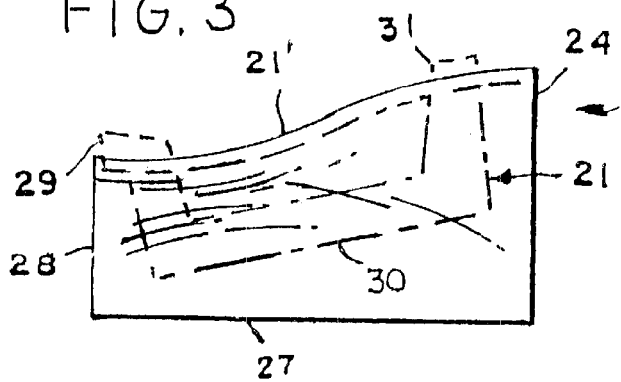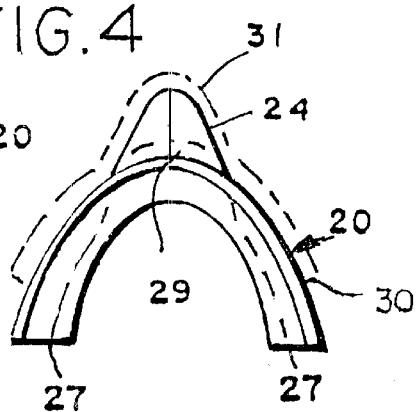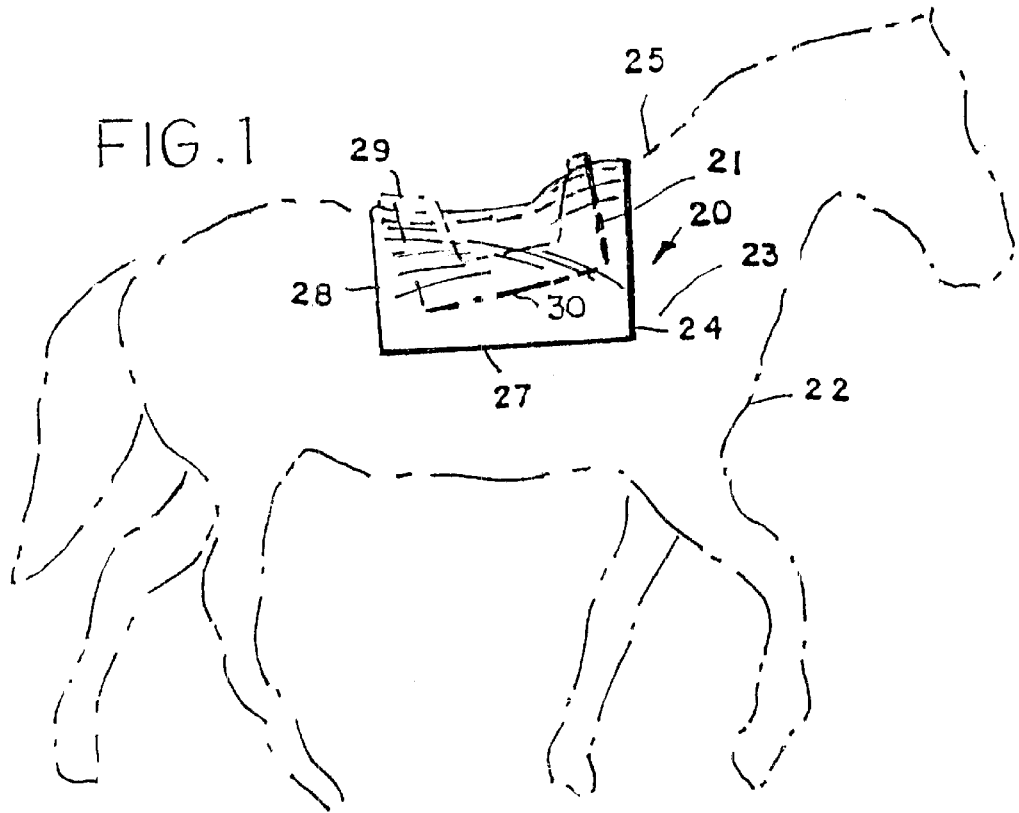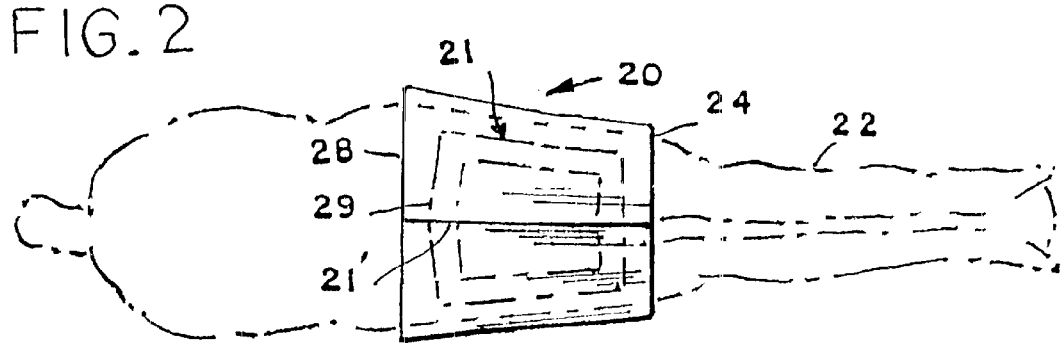

METHOD OF FORMING A SADDLE TREE MOLD

The invention relates to the process or method of manufacturing a custom shaped thermoplastic mold for the saddle area of an equine and the like, and to the mold or form shaped from the process.

It is a further object of the invention to provide a process for custom manufacturing a contoured thermoplastic sheet that has been formed or contoured to a customized, particular shape of a saddle portion of a particular equine or horse, so that the form may be used and reused to produce items such as a customized saddle, or to select an existing saddle to the precise shape of that particular horse for the area of the equine or horse where the saddle rests upon the equine.

It is further object of the invention to provide a novel process or method or steps of shaping a thermoplastic saddle tree and saddle mold panel customized to the shape of a particular equine, horse or animal in the area where a saddle tree would rest upon the equine, horse or animal so that the sheet when molded may serve as a model to form a saddle tree and saddle for that equine, horse or animal.

It is another object of the invention to provide novel method of rapidly and accurately forming a panel to the particular shape of a portion of an animal, so that the panel may be used, once formed or contoured, to in turn form a mold for use in making or selecting an item of animal apparel for attachment to fit a portion of the animal in the particular shape of that portion of the animal.

It is another object of the invention to provide a novel process or steps of forming a customized saddle tree or frame mold by warming a thermoplastic sheet of a size equal that of a saddle tree to a pliable condition, then applying the sheet or panel to the saddle tree area of a equine or horse while pliable and applying pressure against the outside of the panel to force the panel against the equine or horse to change the shape of the panel to closely conform to the shape of the animal in the saddle tree area, and then allow the panel to harden in that shape, so that it may be used as a form or mold to in turn to shape a saddle tree for that animal which saddle tree being shaped to the form of the shaped panel will in turn closely conform to the shape of that equine or horse in the saddle area for greater comfort to the equine.

Further objects and advantages of the invention will become apparent as the description proceeds and when taken in conjunction with the accompanying drawings wherein:

BRIEF DESCRIPTION OF THE DRAWINGS

FIG. 1 is a side elevational view of the thermoplastic customized, contoured saddle tree mold panel on the equine, after the panel has been molded on the equine by the process to conform to the equine's saddle area.

FIG. 2 is a top plan view of the thermoplastic panel or sheet on the equine and after the panel has been molded on the equine to conform to the equine's saddle area, molded about a equine.

FIG. 3 is an enlarged side view of the thermoplastic panel after the panel has been molded on the equine by the process to conform to the equine's saddle area, with an illustration in phantom lines of a saddle of a shape conforming to the equine or horse and to the panel after being molded.

FIG. 4 is a end view of the thermoplastic panel or sheet on the equine after the panel has been molded on the equine to conform to the equine's saddle area with an illustration of the saddle tree for that mold shown in phantom lines.

BRIEF DESCRIPTION OF THE PREFERRED EMBODIMENTS

Briefly stated, the invention comprises a method for measuring and modeling a equine back for the purpose of fitting a saddle or harness. The method employs a sheet of thermoplastic material of a composition that is pliable and moldable upon being heated through various methods to a temperature of at least approximately 120 degrees F. The steps of the method include heating a sizable sheet of the thermoplastic material until pliable, thereupon applying the sheet, while heated and pliable, to the equine withers and back, and applying hand pressure and working the heated sheet to cause it to mold itself closely to the shape of the equine withers and back, then applying cool water to the sheet to hard set the sheet in its closely molded shape, and then removing the sheet from the withers and back. The resulting molded products serves as a mold, in the shape of the withers and back of the particular horse to which the sheet was applied, to build or select a saddle tree to fit the equine.

Referring more particularly to the drawings, in FIG. 1, the thermoplastic sheet 20 used in the process or method of forming a mold for a saddle tree or saddle frame 21 of a saddle.

The preferred method of heating the sheet is heat the sheet in an oven. A kit for making an individualized saddle form for a horse or equine 22 will be provided, which will include a flat tray with insulation of a size to hold the thermoplastic sheet. The tray will be made of metal or other material able to withstand the heat of an oven. As the time the operator wished to use the sheet for making a mold, the sheet will be placed in the tray and the tray placed in an oven an heated to a temperature well above the 120 degrees necessary to cause the sheet to become pliable and moldable. Once the sheet is sufficiently hot, the tray and sheet will be placed the insulated package to keep the tray and sheet sufficiently hot. The operator will then take the package with the sheet to the equine that the saddle mold is being made for, and will remove the sheet and apply it to the equine in the saddle area while the sheet is still hot enough to be moldable and pliable. It is estimated that the an insulated package for the sheet will cause the sheet to retain sufficient heat to remain pliable and moldable for approximately 20 minutes to an hour after taking the sheet from the oven and placing it in the package. The equine will be located sufficiently nearby the oven being used for heating that the sheet may be applied to the equine within a few minutes after it is removed from the heated oven, so that sheet will easily retain sufficient heat to be pliable and moldable by the time it is applied to the equine.

As an alternative, the thermoplastic sheet 20 to form a mold for a saddle tree 21 for a particular equine may be heated by being placed in container and hot water poured into the container and immerse the sheet in hot water to heat it; however, the preferred form of heating the sheet is by heating it in an oven.

The thermoplastic sheet 20 may be heated by other methods such as a hair dryer, or hot water bath.

The thermoplastic sheet 20 will be provided with a center line or several spaced lines 20' to serve as orientation lines to enable the operator to orient the sheet on the animal with the sheet or panel 20 evenly centered on the back of the equine when applying the sheet to the animal.

The sheet 20 will be of a size at slightly larger in length and width than that a customary saddle, tree 21 with its forward edge 24, when the sheet is applied to the equine 22, adjacent and over the withers 25 of an equine 22 and immediately behind the scapula 23 of the equine 22. Its rearward edge 28 will terminate approximately just beyond where the rearward edge of a saddle tree 29 for that equine would customarily terminate. It's lower edges 27 will terminate below where the saddle tree's lower edge 30 would rest on the equine.

The sheet will be applied across the equine withers and back where the saddle would most comfortably fit, using the center line 21' to center the sheet on the back. The mold invention will be formed by applying or draping the hot, moldable and pliable sheet over or about the back of the equine or horse 22 with the forward or front edge 24 of the panel just behind or along rearward portions of the scapula 23 of the horse, approximately over the high point of the spine of the equine or withers 25, with its lower side edges extending downward along each side of the front part of the back of the horse and its rearward edge spaced rearward along the horse sufficient for the length of the saddle tree of the equine or horse.

The operator will use his hands, with a firm steady even hand pressure against the sheet to pressure the sheet against the equine, to mold the hot sheet to conform to the shape or contours of the equine in the saddle area. The sheet will be held in place for approximately three minutes while the sheet cools and becomes hard set. The cooling of the sheet may be accelerated by sponging it with cool water.

As shown in FIG. 2, the forward edge 24 of the sheet 20, when molded to the equine 22, will project upward and extend sufficiently forward to provide a form for the undersurface of the point or gullet 31 at the forward edge of the tree or frame 21, so that the point or gullet 31 can be molded very closely to the form so as to be closely complementary in fit to the withers of the equine. The rearward edge 28 of the sheet will follow the normal shape of the equine thereby also curve upward and extend sufficiently rearward, when molded, to provide a form for the undersurface of the cantle 29 at the rear of the tree, so that the candle of the tree or frame will also closely conform to the shape of the equine. Also, the panel will extend sufficiently downward to provide a form for the under surfaces of the sides 30 of the tree 21.

Once the sheet is hard set, the sheet will be removed from the equine and it may now serve as a three dimensional model of the equine's conformation and general conditioning of the area of the equine molded.

The molded sheet may then used by saddle maker to shape, create, or select a saddle tree or frame and saddle for the equine in accordance with the conformation of the molded sheet.

Thus it will be seen that a simple easy to use, rapidly formed, inexpensive, reliably accurate model has been provided by this method for making a saddle for a particular equine which will retain its shape.

The sheet 20 will be approximately ⅛" thickness and may be approximately 18–20 inches by 24 inches in width and length, respectively. The thermoplastic material being employed for the sheet 20 is of a character recently available to the public which may be heated at lower temperatures, such as approximately 120–150 degrees F., to a pliable moldable condition.

Since the distance between the side panels, as viewed in FIG. 4, is ever increasing, as measured horizontally across, at intervals going downward from the spine or apex formed at the top between the panels, when the sheet has been formed to the shape of the equine in the saddle area, as see in FIG. 4, this enables the tree to be stacked upon the mold, once formed by the process, and its inside conformation will essentially duplicate the inside of the mold and thereby essentially duplicate the a close complementary relationship of the tree to the equine as occurs with the mold and the equine.

This is true, even though the angle between the side panels at these intervals will be wider near the apex than at the lower ends of the panels.

Its pliable moldable state is reached at such a sufficiently low temperature range, that it may be applying to an equine, while in its heated moldable state and remain thereon, without being hot enough to cause injury to the equine from the heat of the panel.

This enables the panel to be applied to the equine while in its hot, moldable, pliable state to mold the panel about the equine to the shape of the equine. It further enables the panel, while hot, to remain on the equine after molding it to the shape of the equine until the panel has cooled and hardened in its moldable shape of the equine in its saddle area.

The method may also be used to provide a form for an individualized harness for an equine.

This method provides a rapid accurate method of forming an individualized mold of the saddle area of the equine or horse so that the mold may in turn be used to provide an accurately shaped saddle tree and saddle that will closely conform to the shape of the particular equine for whom the saddle is intended.

A non stick coating, such as talc, spray silicone, and other materials intended to create a non stickable coating may be applied to the outer surfaces of the panel 20; so that the material or sheet 20, when pliable, will not stick to the hairs of the equine, nor the sheet layers to themselves or other surfaces.

A very thin sheet of poly or plastic, pliable, non thermoplastic material of only a one or a few mils may be applied to the equine or horse in the saddle area, before applying the thermoplastic sheet 20 to the equine for molding; so that the thermoplastic material or sheet 20, when pliable, will not stick to the hairs of the equine.

The thermoplastic material may be reused several times by reheating it and reapplying it to an equine for another model if desired.

While several of the drawing illustrate the mold upon an equine, and also in the same drawing illustrate a saddle tree upon the mold; it is understood that the saddle tree in actuality would not be upon the mold when the mold is upon the equine, but would be upon the mold only after the mold has been removed from the equine, however, it is being so illustrated for brevity and to shown the stacked relation of them and how the mold will have the identical outer shape of the equine to provide a duplicate shape for the saddle tree.

It will be obvious that various changes and departures may be made to the invention without departing from the spirit and scope thereof, and accordingly, it is not intended that the invention be limited to that specifically described in the specification or as illustrated in the drawing but only as set forth in the appended claims wherein:

What is claimed is:

1. A method of making a customized mold for a saddle tree of a saddle for an individual equine comprising the steps of:

heating a thermoplastic sheet, having a size at least equaling a saddle tree and of a character to be pliable and moldable at relatively low temperatures of at least approximately 120 degrees Fahrenheit and which upon cooling to room temperature achieves a set, hardened shape, until it becomes pliable and moldable;

applying the sheet while heated and pliable to the saddle tree area of an equine, and applying pressure upon the sheet in the direction of the equine to cause the sheet to conform to the particular shape of the equine in the saddle tree area;

allowing the sheet to cool to a set, hardened shape while in its conforming shape while on the equine in the saddle tree area; and removing the sheet in its hardened conforming shape and using the sheet as a model for the shape of a saddle tree conforming to the shape of the particular equine in the saddle area.

2. A method according to claim 1, wherein a non thermoplastic non stickable material is applied onto the thermoplastic sheet.

3. A method of making a customized mold for an weight supporting item for the saddle area of an individual animal comprising the steps of:

heating a thermoplastic sheet to a pliable state of a size at least approximately the size of the weight supporting item and of a character to be pliable and moldable at relatively low temperatures of at least approximately 120 degrees Fahrenheit and which upon cooling to room temperature achieves a set, hardened shape;

applying the sheet while pliable and moldable to the saddle area of the animal, and applying pressure upon the sheet in the direction of the animal to cause the sheet to conform to the particular shape of the animal in the saddle area;

allowing the sheet to cool to a set, hardened shape while in its conforming shape while on the animal in the saddle area; and removing the sheet in its hardened conforming shape and using the sheet as a model for a saddle area weight supporting item conforming to the shape of the particular animal in the saddle area.

* * * * *